United States Patent [19]

Nguyen

[11] 4,292,840
[45] Oct. 6, 1981

[54] FUEL CONSUMPTION EFFICIENCY GAUGE

[75] Inventor: Liem Nguyen, Garden Grove, Calif.

[73] Assignee: Orion Industries, Inc., Compton, Calif.

[21] Appl. No.: 147,397

[22] Filed: May 7, 1980

[51] Int. Cl.³ .............................. G01L 3/26; G01L 9/00
[52] U.S. Cl. ...................................... 73/115; 73/733; 200/81.8; 340/52 R
[58] Field of Search ................................ 73/115, 733; 200/DIG. 17, 81.8; 340/52 R

[56] References Cited

U.S. PATENT DOCUMENTS

| | | | |
|---|---|---|---|
| 3,711,828 | 1/1973 | Hawkins | 200/81.8 |
| 3,922,909 | 12/1975 | Dixson et al. | 73/115 |
| 3,938,074 | 2/1976 | Fox | 340/52 R |
| 4,025,897 | 5/1977 | Kisuna et al. | 340/52 R |
| 4,067,232 | 1/1978 | Murray | 340/52 R |
| 4,072,047 | 2/1978 | Reismuller | 73/115 |
| 4,166,382 | 9/1979 | Petersen | 73/115 |
| 4,223,553 | 9/1980 | Fiala | 73/115 |

Primary Examiner—Donald O. Woodiel
Attorney, Agent, or Firm—Fulwider, Patton, Rieber, Lee & Utecht

[57] ABSTRACT

A simple fuel consumption efficiency gauge employs a pointer mechanically coupled to the extremity of a Bourdon gauge. The pointer is electrically coupled to vehicle ground and is bracketed by two contact posts associated with high and low fuel consumption efficiency, respectively. Contact by the pointer with either post completes an electrical circuit through a corresponding light emitting diode to signal good or poor fuel consumption efficiency. When the pointer is between the contact posts, current is continuously supplied to another light emitting diode through a load in order to signal fair fuel consumption efficiency. The device is housed in a casing adapted for connection to similar casings by means of clips and clamps.

12 Claims, 7 Drawing Figures

U.S. Patent    Oct. 6, 1981    4,292,840
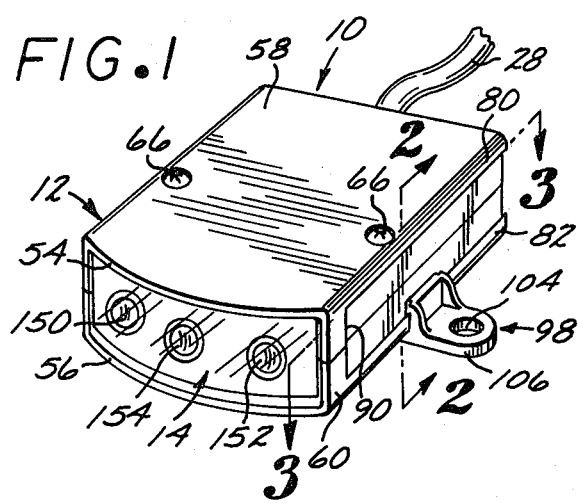
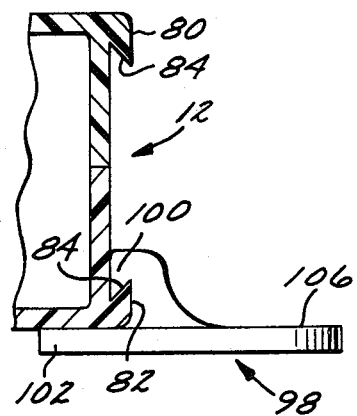
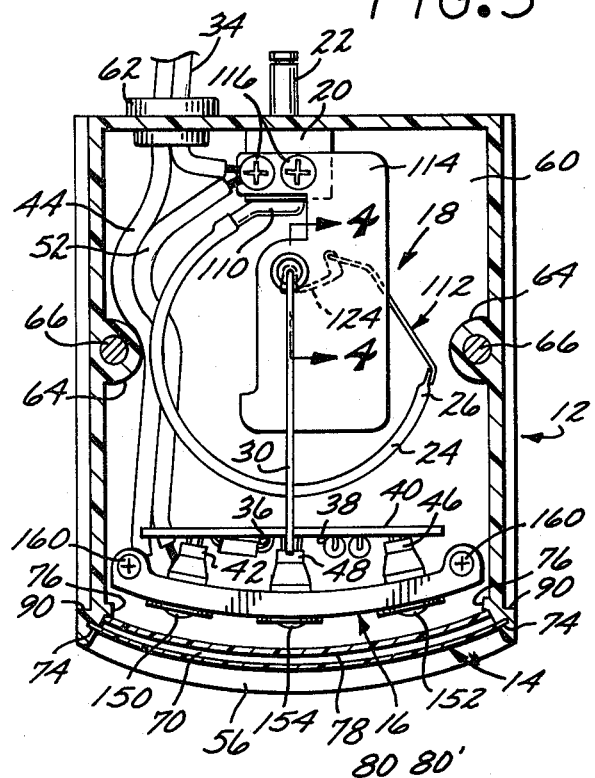
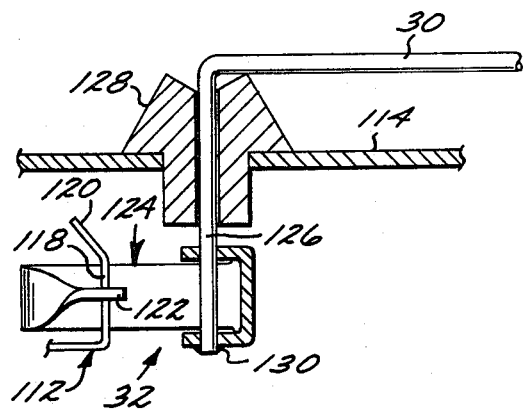
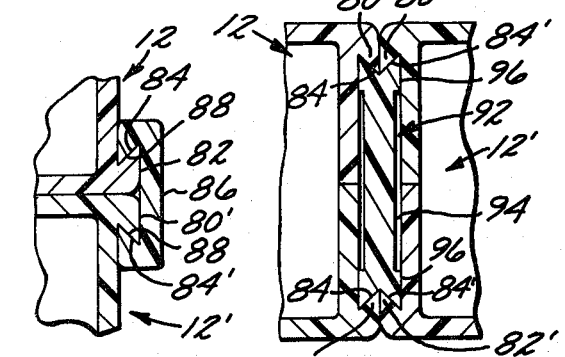
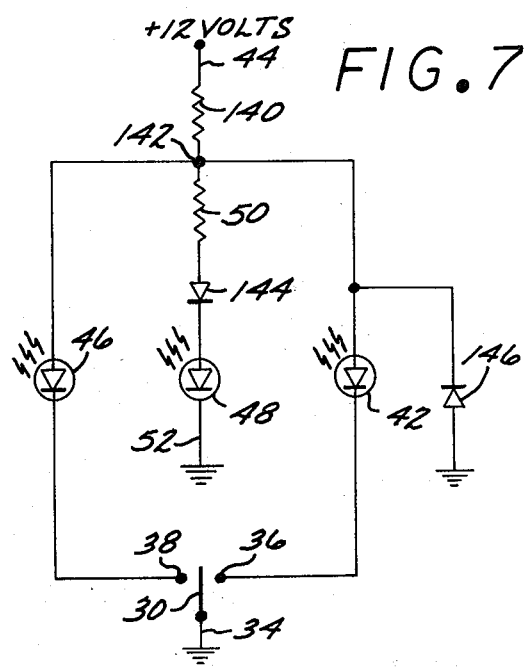

FUEL CONSUMPTION EFFICIENCY GAUGE

BACKGROUND OF THE INVENTION

1. Field of the Invention

The present invention relates to devices for indicating efficiency of fuel consumption in an internal combustion engine, and in particular in automotive vehicles.

2. Description of the Prior Art

Various sophisticated devices are currently available for indicating efficiency of fuel consumption in an internal combustion engine. Some devices are microprocessor based while other devices employ inordinately complex mechanisms to signal the efficiency of operation of an automotive vehicle powered by an internal combustion engine.

Conventional devices utilize as an input the pressure change in the vacuum manifold of an internal combustion engine which varies with the rate of fuel consumption with respect to engine speed. That is, while an internal combustion engine operates, the vacuum in the vacuum manifold decreases with increased fuel consumption for a given engine speed. Conversely, the vacuum increases in the vacuum manifold with a reduction in rate of fuel consumption for a given engine speed. In conventional devices this information is transformed to signals in an illuminated display to indicate economical, fair or wasteful operation, respectively, of an internal combustion engine. Conventional devices of this type at the very minimum involve transistorized driver circuits, gear mechanisms and other inordinately complex arrangements to accomplish the function of producing a visible display in which green, yellow and red indicators are employed to signify the vacuum condition in the vacuum manifold. One such conventional device is marketed as the Micronta fuel economy monitor by Radio Shack Company.

SUMMARY OF THE INVENTION

The present invention employs a unique but simple mechanism in which components serve as both mechanical and electrically conductive elements of vastly reduce the complexity of providing a visible output of the vacuum manifold condition. The device of the invention is housed within a hollow, rigid casing. A pressure gauge, preferably a Bourdon gauge is mounted in the casing and has an arcuate hollow tube that is connected to the vacuum manifold. The arcute tube is immobilized relative to the casing at one end, and the opposite end is free to deflect in one direction in a path of movement responsive to pressure increases in the vacuum manifold an in an opposite direction responsive to pressure decreases in the vacuum manifold. The moveable end of the Bourdon gauge tube is connected through a lever arm to an electrically conductive pointer which in turn is electrically coupled to one d.c. electrical power-terminal, preferably vehicle ground. The pointer rotates about a pivot axis and the free end of the pointer moves between two contact posts which are both secured relative to the casing to transversely bracket the pointer relative to its path of movement.

During fairly efficient fuel consumption periods, the vacuum in the hollow tube will deflect the pointer so that the pointer extends between the contact posts, touching neither. An electrical circuit is connected from the live terminal of the battery of the vehicle within which the fuel consumption efficiency indicator is used to an illuminator, preferably a light emitting diode, through a load. When the pointer does not touch either contact post, the voltage at the input of the illuminator is high enough to actuate the illuminator, thereby creating a visible signal in a specified location indicative of fairly efficient operation of the internal combustion engine.

When the pointer moves into electrical contact with either contact post, however, a by-pass circuit is created which conducts current from the live terminal of the vehicle battery to one of two other illuminators which are not connected in series with the load. The current drain to this other illuminator through the contact post drops the voltage at the input to the illuminator which is always connected in circuit so that it is no longer activated because the voltage and current input thereto is below its threshold of activation. A high vacuum condition within the vacuum manifold will move the pointer into electrical contact with the contact post associated with the illuminator indicative of good driving efficiency, while conversely a low vacuum condition will move the pointer into electrical contact with the contact post associated with the illuminator indicative of low driving efficiency.

The present device differs from prior systems in that a pointer is used which serves as both a mechanical and an electrical element, thus forming an extremely simple transducer system. Because the illuminator indicative of fair fuel consumption efficiency is always in circuit whenever the unit is activated, no gating circuit is required other than a simple load, which may be provided by a dropping diode and/or a dropping resistor connected to ground in series with the fair efficiency illuminator. The only switching circuit required is the simple circuit formed by the pointer of the Bourdon gauge as it operates to swing between the contact posts.

In a preferred form of the invention the illuminators are all located at the front of the casing and the sides of the casing are constructed with pairs of fore and aft upper and lower lips. Each lip in each pair has mutually facing undercut surfaces. Clamps may thereby be employed to coact with the undercut surfaces so that a plurality of casings having corresponding lips of the same physical dimensions and geometry may be coupled in a side by side or vertically stacked array. For example, modular gauges of this type, in addition to the fuel consumption efficiency indicator described in detail herein, may include ammeters, oil pressure gauges, water temperature gauges and other indicators which provide useful information in association with operation of an automotive vehicle or an internal combustion engine in another environment.

The invention may be described with greater clarity and particularly by reference to the accompanying drawings.

DESCRIPTION OF THE DRAWINGS

FIG. 1 is a perspective view of one embodiment of a fuel consumption efficiency indicator according to the invention.

FIG. 2 is a sectional detail taken along the lines 2—2 of FIG. 1.

FIG. 3 is a sectional plan view taken along the lines 3—3 of FIG. 1.

FIG. 4 is a sectional elevational detail taken along the lines 4—4 of FIG. 3.

FIG. 5 is a sectional elevational detail, similar in orientation to FIG. 2, showing the attachment of a plurality of casings in a vertically stacked array.

FIG. 6 is a sectional elevational detail, similar in orientation to FIG. 2, showing a plurality of casings connected together in a horizontal array.

FIG. 7 is a schematic diagram of the circuit of the invention.

DESCRIPTION OF THE DRAWINGS

FIG. 1 illustrates a fuel consumption efficiency indicator 10 which is housed within a plastic casing 12. A pressure gauge 18, preferably a conventional Bourdon gauge, is mounted in the casing 12. An electrically conductive pointer 30 is coupled to the Bourdon gauge by a lever connection 32, depicted in FIG. 4. The pointer 30 is also electrically connected to the vehicle ground through the structure of the Bourdon gauge mounting block 20 and the insulated electrical wire 34 depicted in FIG. 3.

Low and high vacuum electrical contact posts 36 and 38 respectively are secured relative to the casing 12 by means of an upright, transverse rectangular circuit board 40, depicted in FIG. 3. The low and high vacuum contacts 36 and 38 bracket the pointer 30 relative to its horizontal path of movement. A first electrically actuated illuminator 42 is coupled between the live d.c. electrical connection of the vehicle battery by an insulated wire 44 and the low vacuum electrical contact post 36. A second electrically actuated illuminator 46 is coupled between the live d.c. battery terminal by the wire 44 and the high vacuum contact post 38. A third electrically actuated illuminator 48 and a load 50 are coupled between the two d.c. terminals of the vehicle by the wires 44, 52 and 34, as illustrated in FIGS. 3 and 7.

The casing 12 is a relatively thin, oblong structure with boxed in rear corners and with arcuately curved rims 54 and 56 at its front, as illustrated in FIG. 1. The casing 12 is a bifurcated structure having upper and lower mating shell sections 58 and 60, respectively. The back walls of both of the shell sections 58 and 60 are mutually recessed at their interfaces to receive and entrap a grommet 62 through which the wires 34 and 44 pass, and to receive the inlet tube 22 of the Bourdon gauge 18. The lower shell section 60 includes a pair of integrally formed molded in alignment and fastening posts 64, as depicted in FIG. 3. The fastening post 64 include threaded bores which receive phillips head screws 66 which fasten the two shell sections 58 and 60 together, as depicted in FIGS. 1 and 3.

The rims 54 and 56 define the contour of a gently curved transparent face plate 14 which is located in front of a visual indicator display panel 16 at the front of the casing 12, as depicted in FIGS. 1 and 3. The face plate 14 may bear indicia of "poor," "fair" and "good" efficiency imprinted thereon in association with the indicators 42, 48 and 46 respectively. The rims 54 and 56 of the shell sections 58 and 60, respectively, extend toward each other a short distance. Behind each of the rims 54 and 56 there is located a ramp-like retainer 70, curved according to the contour of the rims 54 and 56 and sloping outward from the flat structure of the shell section with which it is associated toward the face plate 14 to define channels in each shell section 58 and 60 just behind the rims 54 and 56 which serve to restrain fore and aft movement of the face plate 14 between the ramp retainers 70 and the rims 54 and 56. The ends of the face plate 14 are received within vertically extending slots 74 defined within the structure of the side walls of the casing sections 58 and 60. Vertically extending and matching ribs 76 are located on the interior side walls of the shell sections 58 and 60 just to the rear of the slots 74 to serve as retainers for a transparent plastic shield 78, as depicted in FIG. 3.

The illuminators 42, 46 and 48 are located at the front of the casing 12 and the sides of the casing 12 are constructed with pairs of parallel fore and aft upper and lower lips 80 and 82, respectively, as depicted in FIGS. 1, 2, 5 and 6. The lips 80 and 82 in each pair have mutually facing undercut surfaces 84, as best illustrated in FIG. 2. Because the lips 80 and 82 are of uniform cross section throughout their length, a generally C-shaped clamp 86 may be engaged with a lower lip 82 of one casing and an upper lip 80' of another casing 12' located directly beneath the casing 12, as depicted in FIG. 5. The C-shaped clamp 86 has ridges 88 which are angled toward each other to fit over and capture the lips 82 and 80'. To attach the casings 12 and 12' together, the casing 12' is located directly beneath the casing 12 and the clamps 86 are inserted on both sides from the rear of the casings. The clamps 86 are pushed forward to abut against the ledges 90 at the front of the casing (FIG. 1). As the clamps 86 are installed on both sides of the casings 12 and 12', the ridges 88 engage the undercut surfaces 84 to securely lock the casings 12 and 12' together.

In a comparable fashion, clips 92 may be employed to fasten casings 12 and 12' together in a horizontal array as depicted in FIG. 6. The clips 92 are each constructed of a thin vertical web 92 terminating in enlarged dovetail ends 96 at both extremities. The dove tail ends 96 fit against and engage the undercut surfaces 84 and 84' of the upper and lower lips of a plurality of casings 12 and 12' positioned side by side to hold the casings together as depicted in FIG. 6.

The lips 80 and 82 may also be used to fasten the casing 12 in position using mounting brackets 98, depicted in FIGS. 1 and 2. The mounting brackets 98 each have an overhanging ledge 100 which fits over and captures one of the lips 80 or 82 and bears against the undercut surface 84 thereon. The mounting brackets 98 are integrally formed plastic structures with a flat base upon which the ledges 100 are mounted. The flat base has a foot 102, over which the ledge extends, and a trailing tab 106.

The mounting brackets 98 are installed by insertion from the rear end of the casing 12 to slip over either a lip 80 or a lip 82. The mounting brackets 98 are moved forward so that the undersurface or top of the casing 12 bears against the feet 102 of the mounting brackets 98. The mounting brackets 98 are fastened to a surface, such as the underside of a vehicle dashboard, by screws that extend through mounting apertures 104 in the trailing tabs 106 thereof.

The Bourdon gauge 18 is depicted in FIG. 3. The Bourdon gauge 18 is mounted in the casing 12 by means of a generally rectangular mounting block 20, and has an inlet tube 22, connectable to a monitoring connection to the vacuum manifold of an internal combustion engine. The hollow tube 22 is connected through the mounting block 20 to a moveable member which is a flattened, arcuately curved hollow tube 24, the cantilevered free tip 26 of which deflects in one direction in a horizontal path of movement responsive to pressure increases in the vacuum manifold and in an opposite direction responsive to pressure decreases in the vacuum manifold. A hollow flexible rubber conduit 28 leads from the tube 22 to the monitoring connection in the engine vacuum manifold.

An internal passageway through the inlet tube 22 and the mounting block 20 extends to the interior of the arcuate brass tube 24. A hollow connecting foot 110 is sealed with solder to both the mounting block 20 and the extremity of the tube 24 which is secured to the mounting block 20. The cantilevered tip 26 of the Bourdon gauge 18 has a configured, rigid wire arm 112 soldered thereto. The wire arm 112 extends toward and beneath a flat mounting plate 114 which is secured to the mounting block 120 by screws 116. At its extremity beneath the mounting plate 114, the arm 112 includes a right angle joint and extends upwardly in a vertical section 118 which is bent at its end 120, as depicted in FIG. 4. The vertical section 118 of the arm 112 is thereby secured in relatively rotatable fashion within a horizontally disposed tab 122 in a generally C-shaped brass lever 124, depicted in FIGS. 3 and 4.

The pointer 30 includes a right angle bend which forms a vertical axle 126 that extends vertically downward through an annular bushing 128 which is fastened to the mounting plate 114. The axle 126 is soldered to the lever 124 at a solder joint 130, as depicted in FIG. 4. Together, the arm 112, the lever 124, and the axle 126 form the lever connection 32 as illustrated in FIG. 4. Moreover, an electrical path is established from the pointer 30 through the brass bushing 128 and the mounting plate 114 to the electrical ground of the vehicle by means of wire 34, as depicted in FIGS. 3 and 4. Electrical continuity is also established from the pointer 30 through the axle 126, the lever 124 and the arm 112 to the metal tube 24 and to the mounting block 20 of the Bourdon gauge 18.

The low vacuum electrical contact 36 and the high vacuum electrical contact 38 are merely short sections of wire soldered to the circuit board 40 to extend upward on either side of the path of movement of the pointer 30. The electrical components of the indicator 10 which are depicted in FIG. 7 are also mounted on the circuit board 40. Specifically, the wire 44, in the preferred embodiment of the invention, is coupled to a ballasting resistor 140, also located on the circuit board 44. The resistor 140 is connected to a junction node 142 which leads to the light emitting diode 42, which forms the illuminator indicative of a low vacuum condition, and also to the light emitting diode 46, which forms the indicator indicative of a high vacuum condition, as depicted in FIG. 7. The junction node 142 is also connected to a load formed by a dropping resistor 50 and a diode 144. The resistor 50 and the diode 144 are coupled in series with the light emitting diode 48 forming the indicator for signifying fair efficiency of fuel consumption. The light emitting diode 48 is connected to vehicle ground through the wire 52, as indicated in FIG. 7, which leads to the common ground wire 34. A protective diode 146 is connected to the junction node 142 leading to the light emitting diodes 42, 46 and 48 so as to prevent damage to the light emitting diodes from fluctuations in the vehicle ground potential.

Preferably, the resistor 140 is a 470 ohm, one half watt resistor, while the resistor 50 is a 100 ohm, one quarter watt resistor. The diodes 144 and 146 are both 1N4001 rectifying diodes. The light emitting diode 42 has a threshold of 1.7 volts, while the light emitting diode 46 has a threshold of 2.1 volts. The light emitting diode 48 has a threshold of 1.8 volts.

The light emitting diodes 42, 46 and 48 are surrounded by red, green and amber plastic transparent caps 150, 152 and 154 respectively, as indicated in FIG. 3. The caps 150, 152 and 154 are mounted in an arcuately curved aluminum visual indicator display panel 16 which is secured by screws 160 that extend down into vertical mounting posts which rise from the floor of the shell section 60.

In the operation of the indicator 10, the wire 44 may be connected to either side of the vehicle ignition switch. The rubber tube 28 is connected to the vacuum manifold by splicing a T connection into a similar rubber tube leading from a monitoring connection in the vacuum manifold to the vehicle distributor. The vacuum condition existing within the vehicle manifold thereby likewise exists within the Bourdon gauge 18 by virtue of the connection to the hollow tube 22.

During the operation of the internal combustion engine at moderate or fair efficiency, the vacuum pressure in the Bourdon gauge 18 will be between 250 and 380 milimeters of mercury. The pointer 30 will reside between the contact posts 36 and 38 without touching either contact post under such vacuum conditions. The 12 volt d.c. supply is dropped in voltage by the resistor 140 and appears at the junction node 142. Since there is no electrical connection to ground through either the light emitting diode 42 or the light diode 46 when the pointer 30 is between the contact posts 36 and 38, all current supplied to the junction node 142 is directed through the resistor 50 and protective diode 144 to the light emitting diode 48. The voltage at the input to the light emitting diode 48 is above 1.8 volts so that the light emitting diode 48 will be continually illuminated as long as no by-pass circuit exists. Illumination of the light emitting diode 48 operates through the amber cap 154, depicted in FIGS. 1 and 3 to inform the vehicle operator that the internal combustion engine is operating at fair or average efficiency. The color coding of the cap 154 may be accompanied by a printed word "AVERAGE" on the face plate 14 directly beneath the cap 154.

If efficiency in fuel consumption should decrease, such as for example during periods of acceleration, the vacuum in the Bourdon gauge 18 will drop. If the vacuum falls to less than 250 milimeters of mercury, the pointer 30 of the Bourdon gauge 18 will reside in contact with the connection post 36, depicted in FIG. 7. A by-pass circuit is thereby formed from the junction node 142 through the light emitting diode 42 which illuminates the red cap 150, depicted in FIGS. 1 and 3. This indicates to the vehicle operator that the operation of the internal combustion engine is at poor efficiency at that time. The word "POOR" may be printed on the face plate 14 directly beneath the cap 150.

When the by-pass circuit exists through the light emitting diode 42, the voltage at the junction node 142 drops significantly so that the voltage appearing at the input to the light emitting diode 48 is less than the requisite threshold voltage of 1.8 volts. The light emitting diode 48 is thereby extinguished until the by-pass connection is broken.

Similarly, when the internal combustion engine is operating at good efficiency, such as during periods of deceleration, a pressure of 380 milimeters of mercury or greater will exist in the Bourdon gauge 18. The pointer 30 will, under such conditions, swing into contact with the contact post 38, thereby creating a by-pass circuit around the light emitting diode 48 through the light emitting diode 46. This will illuminate the green cap 152, thereby indicating good fuel consumption of efficiency. The word "GOOD" may be printed on the face plate 14 directly beneath the cap 152 depicted in FIGS. 1 and 3.

Using the simple circuit arrangement of the present invention in which the pointer 30 serves as both a mechanically moveable element and as an electrical contact, information is easily provided concerning the efficiency of operation of an internal combustion engine without the necessity for the inordinately complex prior art systems. It should be understood that numerous variations and modifications of the invention are possible using the basic principals hereof. For example, the invention need not be limited to use in an automotive vehicle, but is applicable to any situation in which an internal combustion engine having a vacuum manifold is employed. Accordingly, the scope of the invention should not be construed as limited to the specific embodiments depicted herein, but rather is defined in the claims appended hereto.

I claim:

1. A fuel consumption efficiency indicator for use with a direct current power source having d.c. terminals of opposite polarity and an internal combustion engine having a vacuum manifold with a monitoring connection thereto comprising:
   a hollow, rigid casing,
   a pressure gauge mounted in said casing and having a movable member responsive to pressure in said vacuum manifold to deflect in one direction responsive to pressure increases and in an opposite direction responsive to pressure decreases,
   a hollow circuit leading from said pressure gauge to said monitoring connection,
   an electrically conductive pointer mechanically coupled to said movable member of said pressure gauge for movement and electrically connected to a first of said opposite d.c. terminals,
   a low vacuum electrical contact and a high vacuum electrical contact secured relative to said casing to transversely bracket said pointer at opposite limits of movement thereof,
   a first electrically actuated illuminator coupled between a second of said opposite d.c. terminals and said low vacuum electrical contact,
   a second electrically activated illuminator coupled between said second of said opposite d.c. terminals and said high vacuum electrical contact, and
   a third electrically actuated illuminator and a load coupled between said second and said first d.c. terminals.

2. Apparatus according to claim 1 further characterized in that said illuminators are light emitting diodes.

3. Apparatus according to claim 1 further characterized in that said first terminal is electrical ground and said second terminal is a positive voltage terminal.

4. Apparatus according to claim 1 further characterized in that transparent color coded filters are located in front of each of said illuminators.

5. Apparatus according to claim 1 further comprising a circuit board, and said pointer extends transversely across said circuit board, and said illuminators and said load are mounted on said circuit board and said high and low vacuum electrical contacts extend out from said circuit board in spaced separation from each other to restrain said pointer at the opposite limits of movement thereof.

6. Apparatus according to claim 1 further comprising a ballasting resistance located in series circuit with all of said illuminators.

7. Apparatus according to claim 1 further characterized in that said illuminators are located at the front of said casing and the sides of said casing are constructed with pairs of parallel fore and aft upper and lower lips, each of said lips in each pair having mutually facing undercut surfaces, and further comprising clamps, each of which has ridges angled toward each other to fit over and capture a lower lip of one casing and an upper lip of another casing located directly therebeneath by engaging said undercut surfaces.

8. Apparatus according to claim 1 further characterized in that said illuminators are located at the front of said casing and the sides of said casing are constructed with pairs of parallel fore and aft upper and lower lips, each of said lips having mutually facing undercut surface, and further comprising mounting brackets each having an overhanging ledge which fits over and captures one of said lips and bears against the undercut surface thereon.

9. Apparatus according to claim 1 further characterized in that said illuminators are located at the front of said casing and the sides of said casing are constructed with pairs of parallel fore and aft upper and lower lips, each of said lips having mutually facing undercut surfaces, and further comprising clips with dovetail ends which fit against said undercut surfaces of said upper and lower lips of a plurality of casings positioned side by side to hold said casing together.

10. Apparatus according to claim 1 further characterized in that said load is a dropping resistor located between said third illuminator and said second d.c. terminal.

11. Apparatus according to claim 1 further characterized in that said load is a dropping diode located between said third illuminator and said second d.c. terminal.

12. Apparatus according to claim 1 further comprising a protective diode connected to said first d.c. terminal and to all of said illuminators.

* * * * *

Disclaimer 4,292,840.—*Leim Nguyen*, Garden Grove, Calif. FUEL CONSUMPTION EFFICIENCY GAUGE. Patent dated Oct. 6, 1981. Disclaimer filed Mar. 29, 1989, by the assignee, Mr. Gasket Co.

Hereby enters this disclaimer to the entire term of said patent.
[*Official Gazette May 23, 1989*]